United States Patent [19]

Tweadey, II et al.

[11] Patent Number: 5,131,967
[45] Date of Patent: Jul. 21, 1992

[54] METHOD OF MAKING LAMINATED GLAZING UNITS

[75] Inventors: Robert F. Tweadey, II, Farmington Hills, Mich.; Ronald R. Hymore, Oregon, Ohio

[73] Assignee: Ford Motor Company, Dearborn, Mich.

[21] Appl. No.: 632,202

[22] Filed: Dec. 21, 1990

[51] Int. Cl.$^5$ .................................... B32B 31/00
[52] U.S. Cl. .................................... 156/101; 156/106; 156/272.8; 156/327
[58] Field of Search ............... 156/272.2, 272.8, 99, 156/101, 106, 327

[56] References Cited

U.S. PATENT DOCUMENTS

| | | | |
|---|---|---|---|
| 4,087,281 | 5/1978 | Toda et al. ................ | 156/665 X |
| 4,345,235 | 8/1982 | Riley et al. . | |
| 4,478,677 | 10/1984 | Chen et al. . | |
| 4,650,557 | 3/1987 | Bitter . | |
| 4,806,724 | 2/1989 | Kawai et al. . | |
| 4,931,125 | 6/1990 | Volkmann et al. .......... | 156/272.8 |
| 4,931,134 | 6/1990 | Hatkevitz et al. ......... | 156/272.8 X |
| 4,970,369 | 11/1990 | Yamazaki et al. ......... | 156/272.8 X |
| 4,975,145 | 12/1990 | Yamazaki et al. ......... | 156/272.8 X |
| 5,039,364 | 8/1991 | Beckett et al. ............ | 156/60 |

Primary Examiner—David A. Simmons
Assistant Examiner—Chester T. Barry
Attorney, Agent, or Firm—Charles H. Ellerbrock; Roger L. May

[57] ABSTRACT

A method of making a laminated glazing unit having an interfacial coating on a laminated ply includes depositing the coating on the laminted ply and then removing a peripheral portion of the coating. Specifically, the peripheral portion of the coating is exposed to a laser beam of sufficient power to remove the coating. The exposure time and power level are controlled to avoid damage to the underlying substrate. Subsequently, the coated substrate ply is laminated to a ply of PVB or other flexible polymeric laminating material. A substantially direct laminating bond is formed between the laminating ply and the surface of the substrate ply in the peripheral area from which the coating has been removed. The peripheral seal thus formed is environmentally durable and protects the interior of the interface from degradation due to progressive edge corrosion and the like.

14 Claims, 1 Drawing Sheet

METHOD OF MAKING LAMINATED GLAZING UNITS

FIELD OF THE INVENTION

This invention relates generally to a method of making a laminated glazing unit, and more particularly, to a method of making a laminated glazing unit which contains a coating deposited on a laminated surface within the glazing unit. Glazing units can be made by the method of the current invention for automotive uses, such as windshields, for example, and in architectural uses and the like.

BACKGROUND OF THE INVENTION

It is known in the art to fabricate glazing units by laminating a ply of polyvinyl butyral ("PVB") or other flexible polymeric laminating material to a coated glass substrate ply. The coating frequently is carried on an inner surface of the glass substrate ply, that is, a surface which forms a laminated interface with the PVB. Metal-based interfacial coatings are used, for example, in electrically heated glazing units, such as electrically heated motor vehicle windshields, and in automotive and architectural glazing units which provide solar load reduction, that is, selective transparency to visible light. The interfacial coatings used for such purposes typically comprise a transparent, electrically conductive film or film stack deposited onto the inner surface of the glass ply. An exemplary such film stack may comprise, for example, at least one film of silver or other metal sandwiched between (or alternating with) films of zinc oxide or other dielectric material. Other films, such as adhesion films, etc. may also be included in the film stack.

Interfacial coatings in a laminated glazing unit may interfere with interfacial adhesion. Metal-based coatings, for example, may be susceptible to corrosion. Glazing units having electrically conductive, transparent film stacks at a laminated interface have been known to experience corrosion after prolonged exposure to certain environmental conditions. Specifically, such corrosion may occur at the peripheral edge of the glazing unit where the edge of the coating is exposed. The corrosion of the coating may, over time, extend progressively into the interface from the edge of the glazing unit. Ultimately, the corrosion may adversely affect the performance of the coating.

Those skilled in the art are aware of certain methods for improving the lamination between a coated substrate and a laminating material such as PVB. In U.S. Pat. No. 4,650,557 to Bitter there is teaching directed to a process for making a curved, coated glass member suitable for use, for example, in architectural glass, heated mirrors and heated windows, such as electrically heated windshields. A process disclosed in the Bitter patent for producing a laminated glazing unit having a coated interfacial surface includes a step wherein a peripheral zone mask is silk-screened onto a substrate ply. The substrate surface with the peripheral zone mask thereon is then sputter coated with an electrically conductive film stack. The silk-screened mask is then removed, leaving an uncoated peripheral zone. The purpose disclosed in the Bitter patent for such uncoated peripheral zone is to prevent the conductive film stack from being accidentally grounded to any contiguous conductive material. The silk-screened mask is removed by oxidation when the sputter coated substrate ply is fired to oxidize the sputtered film. Bitter suggests that a separate step for oxidation of the sputtered film would be unnecessary if the substrate were heated during the sputter coating operation, but that in such case some other, unspecified means for removing the silk-screened mask would have to be employed.

It is an object of the present invention to provide a laminated glazing unit having an interfacial coating, which glazing unit is more environmentally durable. More specifically, it is an object of at least certain preferred embodiments of the invention to provide a method of making a laminated glazing unit which is less susceptible to progressive edge corrosion resulting from prolonged exposure to environmental conditions. Additional objects and features of the present invention will be better understood in view of the following disclosure.

SUMMARY OF THE INVENTION

In accordance with the present invention, a method of making a laminated glazing unit having an interfacial coating comprises the step of depositing a coating onto an inner surface of a substrate ply, that is, onto a surface of the substrate ply which will form a laminated interface with another ply. The method further comprises the subsequent step of exposing a portion of the deposited coating to a laser beam sufficient to remove the coating from the surface of the substrate ply. More specifically, the laser beam is used to remove a portion of the coating proximate to the peripheral edge of the substrate ply, that is, at or near the periphery of the coated surface. The removed portion is preferably an uninterrupted band or strip at or near the peripheral edge of the coated surface. The method of the invention comprises the additional, subsequent step of laminating the coated surface of the substrate ply to a ply of flexible polymeric laminating material, such as PVB or the like.

A particularly significant and advantageous aspect of the invention is a method of making a motor vehicle windshield wherein a transparent, electrically conductive film stack is deposited onto the surface of a glass substrate ply. A peripheral band or strip of the coating, preferably an uninterrupted band around the entire periphery of the coated surface of the glass ply, is exposed to a laser beam sufficient to remove the coating from that portion of the surface. The glass substrate ply then is laminated to a second ply of glass or plastic or the like by means of a laminating ply of PVB or other suitable polymeric laminating material. The use of a laser to remove the electrically conductive film stack has been found to be surprisingly effective and efficient. Subsequent lamination to the laminating ply results in direct contact between the laminating material and the substantially uncoated surface of the glass in the peripheral zone from which the laser removed the electrically conductive coating. The area of direct lamination is found to provide an environmental durable seal which acts as a barrier against the progression of edge corrosion into the laminated interface. As is well known by those skilled in the art, motor vehicle windshields may be exposed over very prolonged periods of time to a wide variety of environmental conditions, often including extreme temperature and moisture conditions, etc. Accordingly, the present invention, at least in certain preferred embodiments further discussed below, represents a significant advance in the art in that it represents a reliable and efficient method for improving the environmental durability of motor vehicle windshields and other laminated motor vehicle windows having coated interfacial surfaces. For the same reasons, the present invention also has particular application to architectural glazing units. Specifically, the method can be used in the production of laminated architectural glazing units having interfacial coatings.

Additional advantages and features will be better understood from the following discussion of certain preferred embodiments of the invention.

BRIEF DESCRIPTION OF THE DRAWINGS

Certain preferred embodiments of the method of the invention will be discussed below in the context of manufacturing a laminated glazing unit having an interfacial coating, specifically, a motor vehicle windshield having a transparent, electrically conductive coating on an inner surface of an exterior glass ply. In particular.

Figures 1, 2:
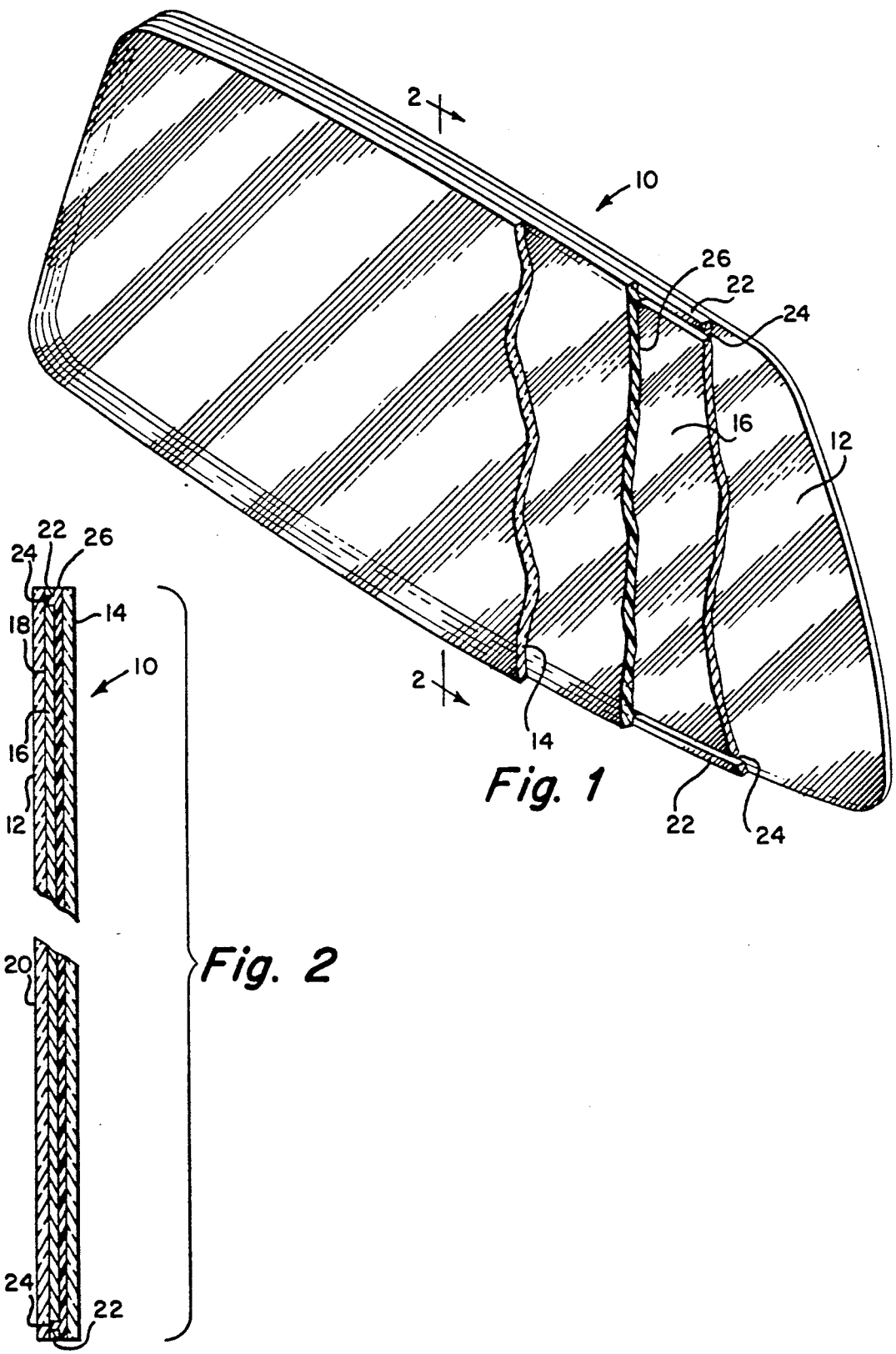
FIG. 1 is a schematic view of a motor vehicle windshield made by a method representing a preferred embodiment of the present invention.
FIG. 2 is a cross sectional view of the motor vehicle windshield of FIG. 1, taken generally along line 2—2 in FIG. 1.

It should be understood that the features and elements of the glazing unit illustrated in FIGS. 1 and 2 are not necessarily precisely to scale. For example, the thickness of the interfacial film stack is shown larger than true scale for ease of illustration and better understanding.

DETAILED DESCRIPTION OF PREFERRED EMBODIMENTS

The method of the present invention is applicable to the manufacture of laminated glazing units adapted for use as architectural windows, motor vehicle windows and other applications. Those skilled in the art will understand the use of the present invention in the manufacture of any such glazing units following the general principles disclosed and discussed below. Those skilled in the art will understand from this disclosure the particular advantages of the invention in providing a reliable, effective and efficient method of improving the environmental durability of laminated glazing units having metal-based transparent, electrically conductive film stacks for solar load reduction and/or electrical heating, in view of their potential for edge corrosion resulting from prolonged exposure to certain environmental conditions.

Referring now specifically to the drawings, FIGS. 1 and 2 illustrate a laminated motor vehicle windshield produced in accordance with a preferred embodiment of the present invention. Windshield 10 comprises a transparent substrate glazing ply and a transparent second ply 14. Preferably, both plys 12 and 14 are glass, although plastic materials, especially self-supporting plastics such as polycarbonate, polyethylene terephthalate ("PET"), polymethacrylate and the like, also are suitable. Selection of a particular material for substrate ply 12 and second ply 14 will depend, in part, on the particular intended application. It should be understood that, as used herein, the term "transparent" means substantially transparent at least to visible light, that is, to radiation in the visible wavelength range. Optionally, additional functional or decorative elements may be added to the glazing unit, such as an anti-reflective coating on any appropriate surfaces of the substrate ply and second ply.

Glazing unit 10 is seen to further comprise a coating, specifically, film stack 16 on the inner surface 18 of substrate ply 12. The film stack 16 may be deposited onto inner surface 18 by any suitable method. Various suitable methods are known to those skilled in the art including, for example, sputter deposition and chemical vapor deposition ("CVD"). Sputter coating processes and equipment, in particular, for deposition of an electrically conductive film stack suitable for solar load reduction and electrical heating purposes are readily commercially available. Other commercially available processes for depositing coatings on a substrate ply, including electron beam evaporation and the like, will be apparent to those skilled in the art in view of the present disclosure.

The actual composition of film stack 16 will depend largely upon the use for which the glazing unit is intended. For electrical heating purposes, the film stack may consist of a single electrically conductive film of metal. Preferably, for enhanced transparency, an electrical heating film stack comprises a film of silver or other metal sandwiched between films of zinc oxide or other suitable dielectric material. If the coating is intended to provide solar load reduction, that is, to preferentially reduce the transparency of the glazing unit to non-visible light, while remaining substantially transparent to visible light, then the coating preferably comprises a film stack in which multiple films of silver or other metal alternate with, and are sandwiched between, films of dielectric material. One preferred film stack for such purpose is a Fabry-Perot interference filter, specifically, a film stack comprising, in order: a first continuous zinc oxide dielectric film directly on the glass surface and having a thickness of about 350 to 450 Angstroms; a first continuous electrically conductive silver metal film having a thickness of about 70 to 120 Angstroms; a second continuous zinc oxide dielectric film having a thickness of about 650 to 1000 Angstroms; a second continuous silver metal film having a thickness of about 70 to 120 Angstroms; and a third continuous dielectric film. The third dielectric film is at the surface of the PVB or other laminating material and preferably comprises a film of zinc oxide having a thickness of about 300 to 450 Angstroms with an ultra-thin film of chromium oxide complex over the zinc oxide immediately adjacent to the PVB laminating layer 26. The ultra-thin film of chromium oxide complex is employed to enhance the durability of interfacial adhesion in accordance with the teachings of U.S. Pat. No. 4,844,985 to Pharms et al, commonly assigned herewith, which teachings are incorporated herein by reference.

The thin chromium oxide film would typically have a thickness in the range of about 20 to 80 Angstroms. It should be understood, of course, that the method of the present invention is applicable to the removal of a wide variety of interfacial coatings. As noted above, however, the method is particularly advantageous in its application to the removal of a metal-based coating from a glass ply for a glazing unit intended to have extended exposure to varied environmental conditions.

Subsequent to deposition of the film stack 16 onto the inner surface 18 of the first substrate 12, a portion of the film stack at or near the periphery of the inner surface 18 is exposed to a laser beam sufficient to remove the coating. Preferably the exposed portion comprises a narrow band or strip at or near the peripheral edge of the substrate ply 12. It also is preferred that the narrow band of uncoated substrate surface extend without interruption around the entire periphery of the substrate ply. In this way, the laminating bond of the PVB or other polymeric material to the substrate ply at such uncoated area will present an uninterrupted barrier to edge corrosion.

In the motor vehicle windshield illustrated in FIGS. 1 and 2, the method of the invention has been employed to remove portion 24 from the film stack. Specifically, the film stack 16 has been removed from substrate ply 12 in a narrow band 24 extending around the entire perimeter of the windshield. The deleted area 24 preferably has a width of about 0.001 inch to about 0.125 inch, and more preferably in a typical motor vehicle windshield application a width of about 0.06 to about 0.125 inch. Portion 22 of the film stack 16 remains on the outermost periphery of the surface 18 of substrate ply 12. The remaining portion 22 would preferably have a width of from 0 to about 0.125 inch in a typical motor vehicle windshield application.

Numerous suitable lasers for generating the laser beam for removing the interfacial coating are commercially available and will be apparent to those skilled in the art in view of the present disclosure. Exemplary lasers include excimer lasers, which are preferred, YAG lasers and $CO_2$ lasers. It will be well within the ability of those skilled in the art to select a laser beam power output level, exposure duration and like process variables for removing the coating in the particular intended application. Typically, a small area of coating will be exposed to the laser beam as it moves progressively around the periphery of the substrate ply. In this way a band or zone of uniform width is cleared by exposure of all points thereof to the laser beam for a substantially uniform period of time. The duration of exposure will depend largely, therefore, on the rate at which the laser beam is advanced.

As mentioned above, it is preferred to employ an excimer laser in the method of the invention to remove a metal-based coating, such as the solar load reduction and electrical heating film stacks described above for a motor vehicle windshield. Excimer lasers are pulsed gas lasers which operate at a number of fixed wavelengths throughout the ultraviolet range. A commonly used 3-component gas mixture is made up mostly of a buffer gas such as neon, a smaller amount of a rare gas such as argon, krypton, or xenon, and a trace amount of a halogen donor such as hydrogen chloride or fluorine. The combination of rare gas and halogen donor determines the output wavelength. The preferred, most powerful excimer lasers include argon fluoride (ArF) at 193 nm, krypton fluoride (KrF) at 248 nm, and xenon chloride (XeCl) at 308 nm. Excimer lasers operate in a pulsed mode, with pulse duration typically of the order of 10 nanoseconds, and output energy per pulse of a few hundred millijoules. Excimer lasers suitable for use in the method of the present invention are commercially available, for example, from Lumonics Laser Systems Group of Livonia, Mich. The laser can be a portable model or, preferably, is in fixed installation in a production line.

One preferred commercial product suitable for use in the method of the invention is the MPS-100 excimer laser from Lumonics, Inc., an integrated laser machining center incorporating an excimer laser of the INDEX 200 Series, also available from Lumonics, Inc. The integrated laser machining center comprises three major components: laser beam delivery modules used to direct the beam to the workpiece and to generate the optimum beam pattern to perform the required task; an enclosed work station with motor drives for precise movement of the workpiece under the laser beam and/or motor drives for moving the laser beam relative the workpiece; and computer numerical control means for controlling the coating removal process, including workpiece movements and laser actuation.

While not wishing to be bound by theory, it presently is understood that the laser beam ablates the film stack. Exposure of the coating to the laser beam is controlled such that virtually all of the coating is removed. In the case of a glass substrate, however, such as in the preferred embodiment of producing a motor vehicle windshield with an interfacial coating employed for electrical heating or solar load reduction, laser beam exposure is preferably controlled to avoid completely removing the coating and exposing the substrate glass. Glass is absorptive of ultraviolet wavelength radiation, such as that generated by excimer and other lasers, and exposure to the laser beam may cause undesirable heating of the glass and consequent changes in the performance characteristics thereof. Thus, preferably, a minimal thickness of coating is left, at least where the remaining coating is an oxide or other material not substantially susceptible to corrosion. Specifically, a thickness sufficiently thin that progression of edge corrosion at the interface is substantially inhibited.

In one preferred embodiment of the invention, a Fabry-Perot film stack suitable for solar load reduction in a motor vehicle windshield, comprising alternating films of silver metal and zinc oxide, as described above, is removed from the surface of a glass substrate ply in a single pass using a Model 210-K, 75 watt (average power) KrF type excimer laser from Lumonics Laser Systems Group. The laser beam is passed through a rectangular aperture (8 by 25 mm) for more precise coating removal. Consequently, somewhat less than the full 75 watts of power reaches the coated surface, which is positioned 19 cm from the aperture. The laser beam generated by such laser removes a 1/16th inch wide band of the coating. Specifically, the laser beam is indexed to the perimeter of the substrate ply and progresses at a speed of about 200 inches per minute. The wavelength of the laser beam for such preferred embodiment is 248 nm, since this wavelength has been found to be particularly effective for the removal of such film stack from a glass substrate without causing significant substrate damage. The energy per pulse of such laser beam is about 250 millijoules. The pulse duration is about 16 nanoseconds and the pulse rate is 300 pulses per second. If the travel rate of the laser beam around the perimeter of the surface is slowed from 200 inches per minute, then the pulse rate would be correspondingly slowed (all other factors remaining constant).

It will be understood by those skilled in the art in view of the present discussion, that progression of any edge corrosion which occurs in remaining portion 22 would be inhibited by the laminating bond between the PVB laminating ply 26 and the substrate ply 12 in area 24. As best seen in FIG. 2, the PVB ply 26 is in substantially direct or immediate contact with surface 18 of substrate ply 12 in the area 24 from which the film stack 16 has been removed. Such laminating bond is formed in the laminating step of the present invention. Specifically, laminating layer 26 is sandwiched between the substrate ply 12 and second glass ply 14. Typically, lamination is accomplished using heat and pressure, during which good interfacial contact and adhesion is achieved. In certain applications, lamination is accomplished using vacuum, typically in conjunction with heat, pressure or both. In motor vehicle windshield applications the PVB or other flexible polymeric laminating material typically will have a thickness of about 0.030 inch.

It will be appreciated from the foregoing that the present invention provides an improved method of making a laminated glazing unit having an interfacial coating on one or more plys. Specifically, in accordance with the present invention a glazing unit is provided wherein the seal between a ply of laminating material and a coated substrate ply is improved, so as to be more environmentally durable, for example, to better resist progressive edge corrosion at the coated interface. Although presently preferred embodiments of the invention have been discussed, it will be apparent to those skilled in the art that various modifications can be made without departing from the true spirit and scope of the invention. The appended claims are intended to cover the invention, including such modifications thereof.

We claim:

1. A method of making a laminated glazing unit, which method comprises the steps of:
   depositing a substantially transparent electrically conductive coating on a surface of a substantially transparent and substantially self-supporting substrate ply;
   exposing a selected portion of said coating on an underlying area of said surface proximate to the periphery of said substrate glazing ply to a laser beam, exposure duration and laser beam power being sufficient to substantially remove said selected portion of said coating from the underlying area of said surface; and
   laminating substantially the entire portion of said surface with said coating thereon, including the area thereof from which said coating has been removed, to a substantially transparent and flexible polymeric laminating ply.

2. The method of making a laminated glazing unit as in claim 1 wherein a third ply is laminated to the flexible polymeric laminating ply opposite the substrate ply glazing.

3. A method of making a motor vehicle windshield comprising the steps of:
   depositing a transparent, electrically conductive film stack onto a surface of a transparent, substantially self-supporting substrate ply;
   substantially removing said electrically conductive film stack from a zone extending around the entire periphery of said surface by exposing it to a laser beam; and
   laminating said surface with said electrically conductive film stack thereon, including said zone from which said electrically conductive film stack has been substantially removed, and a substantially self-supporting second ply to opposite surfaces of a laminating ply substantially transparent and flexible.

4. The method of making a motor vehicle windshield as in claim 3 wherein the substrate ply and the second ply each is glass.

5. The method of making a motor vehicle windshield as in claim 3 wherein the laser beam is produced by an excimer laser.

6. The method of making a motor vehicle windshield as in claim 5 wherein said laser beam has an average power of about 75 watts.

7. The method of making a motor vehicle windshield as in claim 3 wherein the electrically conductive film stack is suitable for electrically heating the windshield.

8. The method of making a motor vehicle windshield as in claim 3 wherein the electrically conductive film stack is suitable for solar load reduction.

9. The method of making a motor vehicle windshield as in claim 3 wherein the film stack comprises a film of silver sandwiched between a pair of dielectric films.

10. The method of making a motor vehicle windshield as in claim 9 wherein the dielectric films are zinc oxide.

11. The method of making a motor vehicle windshield as in claim 3 wherein the laminating ply is polyvinyl butyral.

12. The method of making a motor vehicle windshield as in claim 3 wherein said laminating is performed by application of heat and pressure.

13. The method of making a motor vehicle windshield as in claim 3 where said film stack is deposited by sputter coating individual films of the film stack.

14. A method of making a motor vehicle windshield comprising the steps of:
   sputter coating a transparent, electrically conductive film stack onto a surface of a glass substrate ply;
   substantially removing the electrically conductive film stack from a peripheral zone about 0.06 to about 0.125 inch wide extending around the entire periphery of the surface by exposing the film stack in the peripheral zone to a laser beam of about 75 watts average power and about 248 nm wavelength; and
   laminating the substrate ply, including the peripheral zone of the surface thereof, and a second glass ply to opposite sides of a laminating ply of polyvinyl butyral.

* * * * *